Patented June 11, 1929.

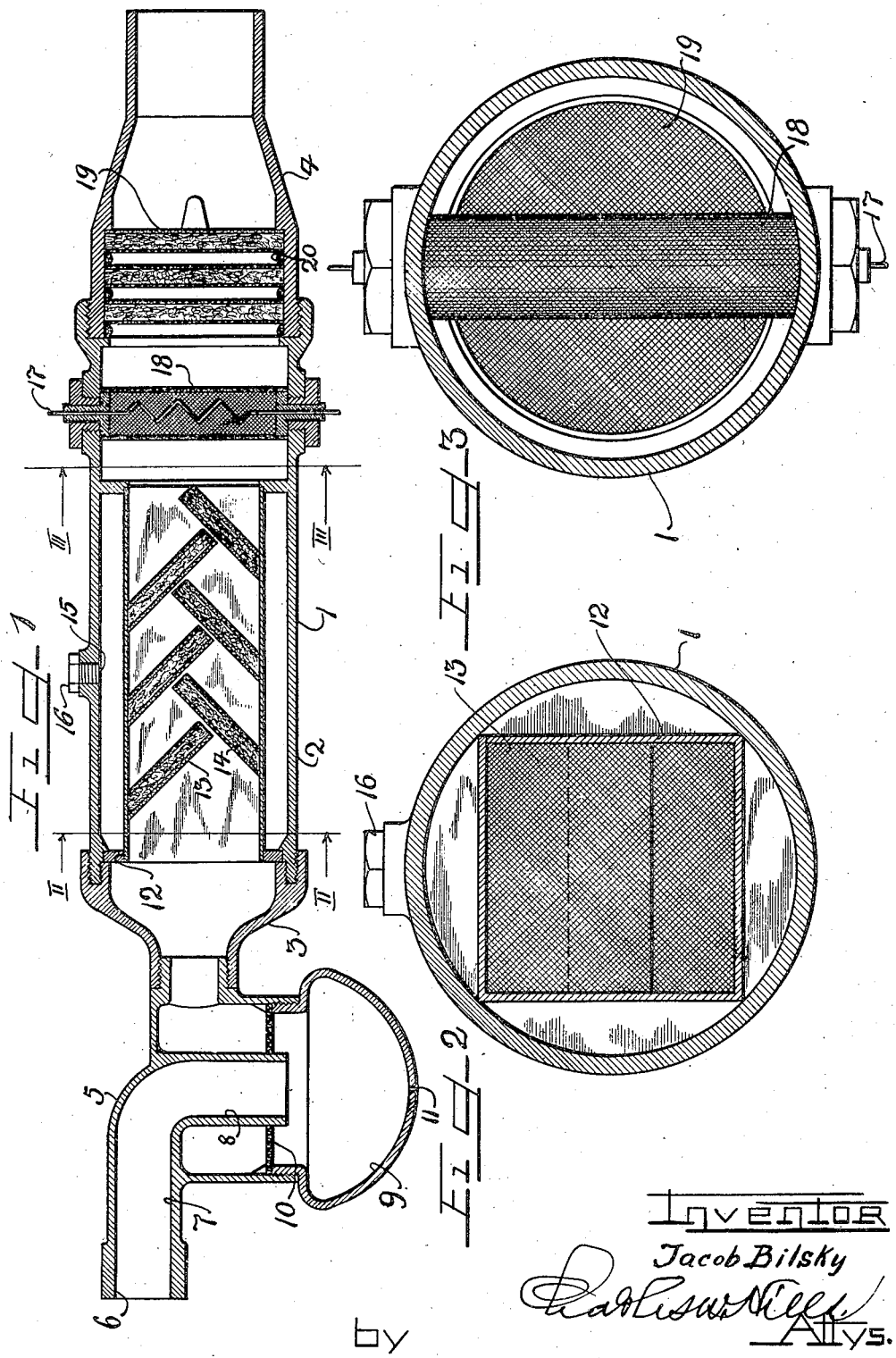

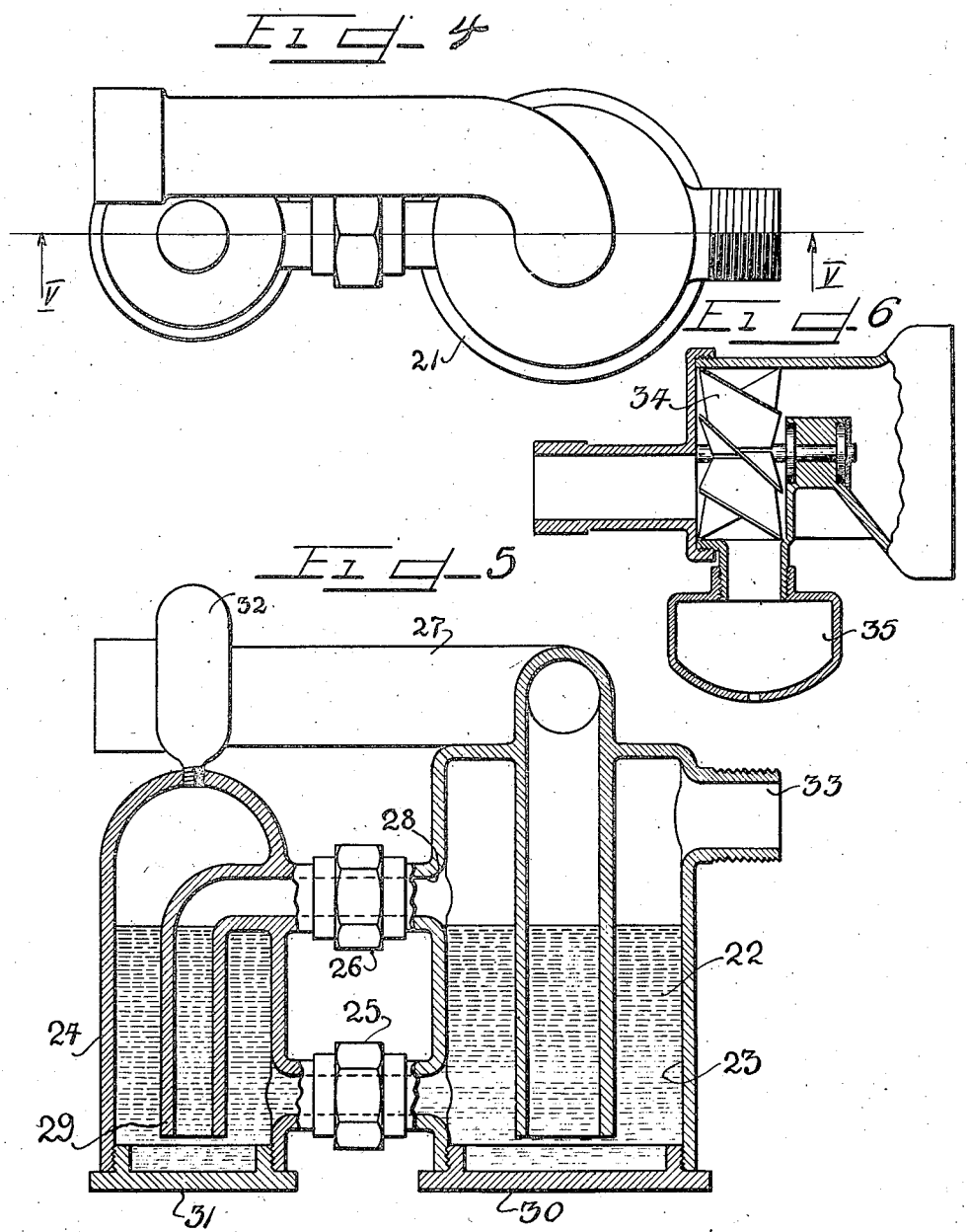

1,716,481

UNITED STATES PATENT OFFICE.

JACOB BILSKY, NOW BY CHANGE OF NAME JOHN GREGORY BILLINGS, OF CHICAGO, ILLINOIS.

PROCESS OF PURIFYING THE EXHAUST GASES FROM INTERNAL-COMBUSTION ENGINES.

Application filed July 13, 1927. Serial No. 205,319.

This invention relates to a process of purifying the exhaust gases from internal combustion engines.

In my copending application entitled "Gas absorbers for products of combustion", Serial No. 166,840, filed Feb. 9, 1927, I have disclosed chemical means for removing the toxic constituents of exhaust gases. The present invention embodies certain improvements over the former, more especially in providing a liquid solvent for removing sulphur containing compounds from the exhaust gases and in providing other and more efficient gas absorbing materials.

It is accordingly an object of this invention to provide an improved process of purifying exhaust gases.

It is a further object of this invention to provide a combination of liquid and dry gas absorbing materials for more effectively removing the obnoxious components from the exhaust gases of internal combustion engines.

It is a further object of this invention to provide a catalytic process for oxidizing certain of the components of the exhaust gases and to provide means for obtaining the necessary temperatures for such oxidation.

Other and further important objects of this invention will become apparent from the disclosures in the specification and the appended claims taken in connection with the accompanying drawings, which illustrate the type of apparatus by which my method can be carried out.

On the drawings:

Figure 1 is a longitudinal sectional view of a gas absorbing apparatus for use with internal combustion engines.

Figure 2 is an enlarged sectional view taken on line II—II of Figure 1.

Figure 3 is an enlarged sectional view taken on line III—III of Figure 1.

Figure 4 is a top plan view of an attachment for use with the apparatus shown in Figure 1.

Figure 5 is a sectional view taken on line V—V of Figure 4 with parts in elevation.

Figure 6 is a fragmentary sectional view of a modified form of my device.

As shown on the drawings:

The reference numeral 1 indicates a casing for housing the gas absorbing materials used in my method for purifying the exhaust gases from internal combustion engines. Said casing 1 is of general cylindrical cross section and is formed in separate sections, including a middle section 2 and tapered end sections 3 and 4 adapted to be threadingly engaged with said intermediate section 2. A member 5 is adapted to be secured to said end member 3 at one end and to be attached at its other end 6 to an exhaust pipe, such as the exhaust pipe commonly found in automobiles leading from the engine. Said member 5 comprises an intake pipe 7 having a downwardly turned elbow 8. A catch basin 9 is adapted to be threaded upon the lower end of said member 5 and to receive the entrained oily residues and condensate discharged from the elbow 8. A filter 10 of metallic gauze or other suitable substance is positioned above the lower end of said elbow 8 to prevent the entrained oily residues and condensate from passing out of the catch basin 9 into the casing 1. Said catch basin 9 is provided with a small aperture 11 to permit the condensate and other entrapped liquid to drain out of said catch basin without allowing the escape of substantial quantities of exhaust gases.

In the intermediate section 2 of the casing 1, there is positioned a frame 12 supporting a plurality of hollow baffles 13 arranged in inclined staggered relation. Said hollow baffles 13 are preferably formed with walls of foraminous material 14 and contain solid substances of an oxidizing and absorbing nature, such as disclosed in my co-pending application, Serial No. 166,840, filed February 9, 1927. In that application, I disclosed sorbent materials, such as charcoal, cuprous chloride, cuprous ammonium sulphate and palladium chloride; oxidizing agents such as sodium permanganate, boric acid and ferric oxide, together with nickel oxide, and chlorine absorbing compounds such as hexamethylenetetramine. In addition to the sorbents mentioned, I propose to use sodium sulphanilate and magnesium silicate, and in addition to the oxidizing agents, sodium perborate and copper oxide. I also propose to use catalysts, such as stannous chromate, ferrous oxide and bismuth oxide, and nickel oxide and aluminum oxide.

Since much of the gasoline used today contains heavy metal anti-knock compounds, such as tetra-ethyl lead, I provide certain chemicals capable of reacting with such compounds to remove them from the exhaust gases. Sodium chromate and dibasic sodium phosphate are applicable for this purpose, as they form insoluble, non-volatile lead compounds.

An opening 15 is provided in the casing 2 for connecting the interior of said casing to the intake manifold of the engine in order that a portion of the purified exhaust gases may be returned to the engine. It has been found that exhaust gases normally contain a relatively large percentage of unburned hydrocarbon vapors, and that if the exhaust gases are reutilized in this manner, a considerable saving is effected and also anti-knock properties are imparted to the fuel mixture. A plug 16 normally closes said aperture 15 when the gases are not being returned to the intake manifold. At the exhaust end of said casing section 2, there is positioned a heating element 17 enclosed within a foraminous cylinder 18 to prevent ignition of the exhaust gases. Said element 17 is adapted to be heated to a suitable temperature to provide the most effective conditions for carrying out the catalytic reactions. For instance, the oxidation of carbon monoxide to carbon dioxide in the presence of nickel oxide and aluminum oxide takes place most efficiently at temperatures of around 300° C.

A plurality of closed baffles 19 are provided in the end section 4 to insure complete absorption and oxidation of the toxic ingredients of the exhaust gases. Said baffles 19 are spaced apart by means of spacing rings 20 and completely fill the interior bore of the section 4. After passing through said hollow baffles 19, which contain similar sorbents, oxidizing materials and catalysts to those already described, the exhaust gases are discharged into the atmosphere in a purified condition.

In place of the member 5, I propose to use, especially when a portion of the gases are to be returned to the engine, a suitable apparatus indicated as a whole by the reference numeral 21, for containing a washing liquid 22, as shown in Figures 4 and 5. Said apparatus 21 comprises a plurality of chambers 23 and 24 connected together by suitable unions 25 and 26, at different elevations. A pipe 27 leads from the exhaust pipe of the engine to the bottom of said chamber 23, which is adapted to be filled with a washing liquid 22 up to the height of the connecting pipe 28 between said chambers 23 and 24. Said pipe 28 terminates in a downwardly extending portion 29 leading to the bottom of said chamber 24. Said chambers 23 and 24 are provided with caps 30 and 31, respectively, for draining the wash liquid from the respective chambers. A relief valve 32 is positioned at the end of said chamber 24 to prevent an excess gas pressure within said chamber. The exhaust gases, after passing through the washing liquid 22, are discharged from an opening 33 to the casing 1 above described.

I have found that solvents, such as hydrogenated naphthalenes and the like, possess excellent properties for use as a washing liquid in the apparatus just described. Tetrahydronaphthalene, while a high boiling solvent, is suitable for use in internal combustion engines, so that any vapors of the tetrahydronaphthalene carried over into the gas absorption apparatus and back to the engine through the opening 15 are not at all detrimental to the operation of the engine. Furthermore, sulphur-containing gases such as hydrogen sulphide are readily dissolved by tetrahydronaphthalene and thus removed from the exhaust gases. Since such sulphur-containing gases are not only obnoxious when discharged into the atmosphere, but are exceedingly detrimental if returned to the engine, it is apparent that their elimination is very desirable. The addition of a small quantity, say up to 10% of camphor to the hydrogenated naphthalene is desirable, as camphor forms loose compounds with sulphur-containing gases.

In Figure 6, there is shown a modified form of attachment to my apparatus including a turbine 34, for more effectively reducing the back pressure of exhaust gases from the engine. Said turbine 34 serves to separate the oily residues and entrained condensates from the exhaust gases, and by centrifugal action, deposits said residues and condensates in a catch basin 35 positioned below said turbine.

From the foregoing, it will be apparent that my process of purifying the exhaust gases from internal combustion engines contemplates the removal of oily residues and condensates by mechanical means, the removal of sulphur-containing gases by passing the exhaust gases through a hydrogenated naphthalene, which may contain dissolved camphor, and the absorption, oxidation and fixing of other obnoxious components of the exhaust gases, including carbon monoxide, heavy metal compounds and others, by means of suitable solid materials and catalysts. My process also contemplates the heating of the exhaust gases to a suitable temperature for the carrying out of the catalytic reactions and the use of pressure or sub-atmospheric conditions for the greater efficiency of the reactions involved.

I am aware that numerous details of the process may be varied through a wide range without departing from the principles of this invention, and I therefore do not purpose limiting the patent granted hereon, otherwise than necessitated by the prior art.

I claim as my invention:

1. In the process of purifying exhaust gases, the step of removing heavy metal compounds by passing said gases through masses containing sodium chromate.

2. In the process of purifying the exhaust gases from internal combustion engines, the preliminary step of passing said gases through a washing liquid containing hydrogenated naphthalene.

3. In the process of purifying the exhaust gases from internal combustion engines, the preliminary step of passing said gases through a washing liquid containing hydrogenated naphthalene and dissolved camphor.

4. In the process of purifying the exhaust gases from internal combustion engines, the preliminary step of passing said gases through a washing liquid containing tetrahydronaphthalene.

In testimony whereof I have hereunto subscribed my name at Chicago, Cook County, Illinois.

JACOB BILSKY.